United States Patent Office 2,937,161
Patented May 17, 1960

2,937,161

PROCESS FOR MAKING POLYAMIDES FROM DIAMINES AND ESTERS CONTAINING ONLY C, O AND Cl.

Ellsworth K. Ellingboe, Highland Woods, Del., assignor to E. I. du Pont de Nemours and Company, Wilmington, Del., a corporation of Delaware No Drawing. Application July 1, 1955
Serial No. 519,644

10 Claims. (Cl. 260—78)

This invention relates to a new process for the preparation of high molecular weight polyamides.

Synthetic linear polyamides are of considerable economic importance primarily as fibrous or molded products. These polymers, generically termed nylons, are generally obtained by the condensation of substantially equimolecular amounts of a diamine and a dicarboxylic acid or by the self-condensation of relatively long chain amino acids.

This invention has as an object a new process for the preparation of nylon type polyamides. Other objects will appear hereinafter.

These objects are accomplished by the present invention wherein high molecular weight polyamides are obtained by the reaction of diamines having hydrogen on each nitrogen with trichloromethyl or tetrachloroethylene esters of dibasic carboxylic acids or of half acid chlorides of dibasic acids, i.e., the $Cl_3C-$ or $$-CCl_2Cl_2C-$$

esters of monoacid chlorides of dibasic acids. Surprisingly, the resulting polyamides contain not only dibasic acid residues derived from the dibasic acid portion of the ester but also dibasic acid residues derived from the trichloromethyl or tetrachloroethylene unit.

In a preferred embodiment of this invention the trichloromethyl or tetrachloroethylene esters contain only carbon, oxygen and chlorine and are esters of 1–3 carbon dibasic acids, including the monoacid chlorides of such acids. Polyamides are formed when these esters are reacted with an organic compound having two hydrogen-bearing amino groups, preferably a diamine having two hydrogens on each amino nitrogen. The reaction takes place in a molar ratio of one mole of diamine per each trichloromethyl, tetrachloroethylene and dibasic acid moiety in the chlorine-containing ester.

An acid ester which contains different length carbon units, e.g., one carbon units and two carbon units as in tetrachloroethylene carbonate, reacts with diamines to give copolyamides such as a copolyoxamideurea.

The formation of the polyamide can be effected in both aqueous and nonaqueous media. The following examples further illustrate the process of this invention.

EXAMPLE I

*Polyamides from tetrachloroethylene carbonate and hexamethylenediamine in aqueous system*

Polymerizations were carried out, with the amount of reactants as given in Table 1, in a system having highly effective stirring as follows. A 300-ml. solution of hexamethylenediamine ($C_6H_{12}(NH_2)_2$) and sodium hydroxide in distilled water was stirred while a 300-ml. solution of tetrachloroethylene carbonate ($C_3Cl_4O_3$) in carbon tetrachloride was added rapidly. The resultant creamy dispersion was stirred for one minute, 200 ml. of 3% hydrochloric acid was added to quickly stop further reaction, and stirring was continued for two more minutes. The precipitated polymer was then filtered with suction and washed on the filter with distilled water until the wash was free of chlorine ion. The washed polymer was dried under high vacuum at room temperature. Table 1 gives the data for three different polymers prepared by the above procedure from tetrachloroethylene carbonate and hexamethylenediamine. In Table 1, as in Tables 2, 4, 5, and 6, the "equiv." refers to the equivalent amount, i.e., to the weight per reactive unit weight, i.e., one half of the molar amount of diamine the molar amount of alkali, and the unit molar amount of chlorinated ester divided by the number of replaceable chlorines, "$\eta_{inh.}$" is the inherent viscosity as measured at 25° C. in 0.5% solution in m-cresol and N is the percent nitrogen.

TABLE 1

| Hexamethylene-diamine | | Sodium Hydroxide | | Tetrachloro-ethylene Carbonate | | Polymer | | | |
|---|---|---|---|---|---|---|---|---|---|
| g. | equiv. | g. | equiv. | g. | equiv. | g. | equiv. | $\eta$ inh. | N |
| 4.176 | .072 | 1.44 | .036 | 4.068 | .072 | 2.6 | .033 | 0.44 | 16.86 |
| 4.176 | .072 | 2.88 | .072 | 4.068 | .072 | 4.9 | .063 | 0.74 | 17.50 |
| 2.088 | .036 | 2.88 | .072 | 4.068 | .072 | 2.3 | .030 | 0.49 | 17.06 |

Substitution of methylene chloride for the carbon tetrachloride as well as omission of the latter did not substantially change the polymerization.

EXAMPLE II

*Polyamide from tetrachloroethylene carbonate and hexamethylenediamine in nonaqueous media*

A polymerization reaction of hexamethylenediamine and tetrachloroethylene carbonate was carried out in a nonaqueous system, using the general procedure outlined above. In this instance hexamethylenediamine and triethylamine (instead of sodium hydroxide) dissolved in carbon tetrachloride were placed under vigorous stirring conditions, and the remainder of the process was carried out as before, including the quick stop with 3% aqueous hydrochloric acid and the subsequent filtering, washing and drying steps. The data are as follows:

TABLE 2

| Hexamethylene-diamine | | Triethylamine | | Tetrachloro-ethylene Carbonate | | Polymer | | | |
|---|---|---|---|---|---|---|---|---|---|
| g. | equiv. | g. | equiv. | g. | equiv. | g. | equiv. | $\eta$ inh. | N |
| 3.0 | .0518 | 5.22 | .0518 | 2.92 | .0518 | 2.4 | .0210 | .56 | 17.84 |

It should be noted that the theoretical reaction of hexamethylenediamine and tetrachloroethylene carbonate would produce a copolyoxamide-urea, i.e., have the recurring unit

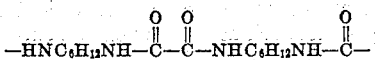

The following table of calculated nitrogen percentages is given for reference:

TABLE 3

| Polymer | N |
| --- | --- |
| Hexamethylene oxamide | 16.50 |
| Hexamethylene urea | 19.70 |
| Hexamethylene 1/1 oxamide/urea | 17.95 |

EXAMPLE III

*Polyamide from tetrachloroethylene oxalate and hexamethylenediamine*

Using the general procedure described under Example I, tetrachloroethylene oxalate dissolved in chloroform was added to an aqueous solution of hexamethylenediamine and sodium hydroxide, and the resulting polymer (polyhexamethyleneoxamide) was isolated. The data are as follows:

TABLE 4

| Hexamethyl-enediamine | | Sodium Hydroxide | | Tetrachloro-ethylene Oxalate | | Polymer | | |
| --- | --- | --- | --- | --- | --- | --- | --- | --- |
| g. | equiv. | g. | equiv. | g. | equiv. | g. | equiv. | η inh. |
| 3.48 | .06 | 2.4 | .06 | 3.81 | .06 | 1.9 | .0024 | .12 |

EXAMPLE IV

*Polyamide from bis-trichloromethyl oxalate and hexamethylenediamine*

The procedure described under Example I was used to prepare a polyamide from aqueous hexamethylenediamine and bis-trichloromethyl oxalate dissolved in carbon tetrachloride. The data are as follows:

TABLE 5

| C₆H₁₂(NH₂)₂ | | NaOH | | C₄Cl₆O₄ | | Polymer | | | |
| --- | --- | --- | --- | --- | --- | --- | --- | --- | --- |
| g. | equiv. | g. | equiv. | g. | equiv. | g. | equiv. | η inh. | N |
| 3.48 | .06 | 2.40 | .06 | 3.25 | .06 | 3.4 | .045 | .55 | 18.24 |
| (Theoretical hexamethylene 1/2 oxamide/urea) | | | | | | | | | 18.50 |

EXAMPLE V

*Polyamide from hexamethylenediamine and tetrachloroethylene bis-chlorocarbonate*

The general procedure of Example I was repeated except that tetrachloroethylene bis-chlorocarbonate,

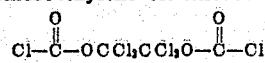

was employed as the chloroester. The amounts used in the formation of the polymer and the properties of the polyamide are given in Table 6.

EXAMPLE VI

*Polyamide from hexamethylenediamine and trichloromethyl chlorocarbonate*

The general procedure of Example I was repeated except that trichloromethyl chlorocarbonate,

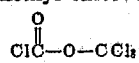

was employed. The amounts used in the preparation of the polyamide and the properties of the resulting polymer are given in Table 6.

EXAMPLE VII

*Polyamide from hexamethylenediamine and bis-trichloromethyl dichloromalonate*

The general procedure of Example I was repeated except that bis-trichloromethyl dichloromalonate,

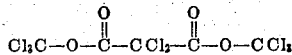

was used. The data for the amounts employed and the polymer properties are given in Table 6. The polymer contained 18.17% Cl.

The bis-trichloromethyl dichloromalonate was prepared as follows:

Dimethyl malonate was chlorinated in a cylindrical "Pyrex" glass reactor, 7.5 cm. in diameter by 25 cm. long, fitted with a sintered glass chlorine inlet tube, a thermocouple well, and a "Dry-Ice" cooled reflux condenser. Approximately 110 g. (0.83 mole) of dimethyl malonate was placed in the reactor and heated to 80° C.–85° C. by irradiation with two 275-watt RS sun lamps. The addition of chlorine was then started, the temperature was allowed to rise to 120° C.–130° C., and the reaction was carried out at this temperature by adjusting the chlorine input slightly below the point at which a yellow condensate of free chlorine appeared in the "Dry-Ice" cooled reflux condenser as well as by moving the sun lamps to an appropriate distance from the reactor. The turbulence provided by the incoming chlorine and the consequent evolution of hydrogen chloride kept the reaction mixture well stirred. In a 35-hour reaction period, 531 g. (7.5 mole) of chlorine was introduced. The reaction was judged complete when an excess of refluxing chlorine failed to diminish in 30 minutes after addition of chlorine was stopped. The crude product, which solidified on cooling, weighed 340.8 g. The bis-trichloromethyl dichloromalonate crystallized in needle form from petroleum ether, M.P. 73° C.–74° C.

*Analysis.*—Calculated for $C_5Cl_8O_4$: Cl, 69.65%. Found 69.77%.

TABLE 6

| Example No. | Hexamethyl-enediamine | | Sodium Hydroxide | | Chloroester | | Polymer | | |
| --- | --- | --- | --- | --- | --- | --- | --- | --- | --- |
| | g. | equiv. | g. | equiv. | g. | equiv. | g. | equiv. | η inh. |
| V | 3.48 | .06 | 2.4 | .06 | 3.25 | .06 | 3.4 | .045 | .67 |
| VI | 3.48 | .06 | 1.97 | .06 | 1.97 | .06 | 1.9 | .0218 | .20 |
| VII | 3.48 | .06 | 2.4 | .06 | 4.08 | .06 | 4.6 | .0514 | .74 |

EXAMPLE VIII

*Polyamide from tetrachloroethylene carbonate and piperazine in aqueous systems*

To 2.37 g. (0.0275 mole) of piperazine dissolved in 400 ml. of water containing 2.0 g. (0.05 mole) of sodium hydroxide was added with rapid stirring 50 ml. of methylene chloride containing 2.83 g. (0.0125 mole) of tetrachloroethylene carbonate. Rapid stirring was continued for five minutes after the addition was complete. The mixture was then poured into 1000 ml. of water and boiled one-half hour. The polymeric product was removed by filtration, washed with water and then methanol and dried in a vacuum oven at 60° C. for about 16 hours. The inherent viscosity determined in 60/40 mixture of tetrachloroethane/phenol was 0.18.

EXAMPLES IX–XIX

*Polyamides from tetrachloroethylene carbonate and diamines in nonaqueous solutions*

To 0.025 mole of diamine in 150 ml. of dry alcohol-free chloroform containing 5.06 g. (0.05 mole) of triethylamine was added 2.83 g. (0.0125 mole) of tetrachloroethylene carbonate in 100 ml. of chloroform. A highly swollen precipitate formed shortly. After standing for about 16 hours, the mixture was poured with stirring into 2000 ml. of methanol. The polymer was removed by filtration, washed with water and then with methanol. After drying for about 16 hours at 60° C. the yield and properties of the polymer were determined. Table 7 shows the results obtained. In the table, the viscosity was determined in a 60/40 mixture of tetrachloroethane/phenol except for Example IX—in this the viscosity was determined in sulfuric acid.

Substitution of other solvents, such as methylene chloride, trichloroethylene, and 1,1,2-trichloroethane, for the chloroform had little effect upon the reaction and polymer obtained.

TABLE 7

| Example | Diamine | Yield, percent | Inherent Viscosity | Polymer Melting Temperature, °C. |
|---|---|---|---|---|
| IX | Ethylenediamine | 6 | 0.10 | 400 |
| X | Trimethylenediamine | 9 | 0.14 | 246 |
| XI | Tetramethylenediamine | 63 | 0.30 | 312 |
| XII | Pentamethylenediamine | 76 | 0.24 | 246 |
| XIII | Hexamethylenediamine | 74 | 0.57 | 270 |
| XIV | 4,4-Dimethylheptamethylenediamine | 89 | 0.24 | 194 |
| XV | 5-Methylnonamethylenediamine | 96 | 0.21 | 148 |
| XVI | Bis-(p-aminocyclohexyl)methane (solid isomer at room temperature) | 74 | 0.49 | 274 |
| XVII | m-Phenylenediamine | 100 | (insol.) | |
| XVIII | p,p'-Diaminodiphenylmethane | 100 | (insol.) | |
| XIX | Benzidine | 100 | (insol.) | |

The process of the present invention is generic to the preparation of polyamides by reacting, with a trichloromethyl or tetrachloroethylene ester of a dibasic carboxylic acid, an organic compound having two hydrogen-bearing amino groups. The amino compound preferably has two hydrogens on each amino nitrogen, e.g., a diprimarydiamine. The more useful polyamides are obtained when the diamine employed has a chain of at least four carbons separating the amino nitrogens, although as shown in Examples IX and X, those having two and three carbons give polymers. In addition to those disclosed in the examples, diamines that can be used include tetramethylenediamine, octamethylenediamine, decamethylenediamine, dodecamethylenediamine, N,N'-dimethylhexamethylenediamine, 2,5-dimethylhexamethylenediamine, 1,4-diaminocyclohexane, and 2,5-dimethylpiperazine. The invention is generically applicable to polyamide forming compounds having two hydrogen bearing amino groups. It thus includes compounds of this nature as disclosed in U.S. Patents 2,356,702, 2,274,831, and 2,704,282.

The chlorine-containing esters reacted with the diamines have either the trichloromethyloxy, CCl₃O—, or the tetrachloroethylenedioxy, —OCCl₂CCl₂—O—, group present. Under the conditions of reaction with primary or secondary diamines, the above chlorine-containing units are converted to the carbonate or oxalate moiety, each of which has both of the remaining valences attached to nitrogen of the amine, i.e.,

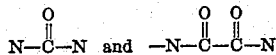

The chlorine-containing esters employed are the trichloromethyl or tetrachloroethylene esters of dibasic carboxylic acids or of the half acid chlorides of such acids. As shown in the examples, the dibasic acid portion includes those of carbonic, oxalic, chlorocarbonic, and dichloromalonic. The preferred esters contain only carbon, oxygen and chlorine and contain at least two and generally up to six carbons.

Polyesteramides and polyesters are obtained when a part or all of the diamine is replaced by hydroxylated organic compounds such as diphenylolpropane.

The chlorine-containing esters are generally obtained by the light-catalyzed complete chlorination of such compounds as ethylene carbonate, ethylene oxalate, ethylene bis-chloroformate, methyl chloroformate, and dimethyl malonate. The chlorination is generally conducted at temperatures of 75° C.–125° C. in the presence of actinic light until no further chlorination can be achieved as characterized by weight gain of the ester, presence of unreacted chlorine or analysis of the product. The copending application Ser. No. 519,645 concurrently filed by E. K. Ellingboe and L. R. Melby gives further details of the preparation of tetrachloroethylene oxalate, carbonate, and chlorocarbonate. Trichloromethyl chlorocarbonate and bis(trichloromethyl)carbonate can be prepared by the methods referred to in Beilstein, 4th ed., vol. III, 1st Supplement, page 8, and bis(trichloromethyl)oxalate by the methods of Cahours, Beilstein, 4th ed., vol. III, page 17.

In the polymer forming process of this invention the organic compound having two hydrogen-bearing amino groups is intimately mixed with chlorine-containing ester. The reaction can be effected in aqueous media or in nonaqueous media as shown in the examples. The medium or solvent must be one which is substantially nonreactive with the polymer-forming materials, or at least the rate of reaction is quite low compared to the reaction rate of the organic amino compound with the chlorinated ester. Inert solvents or diluents that can be employed include hydrocarbons, e.g., hexane, cyclohexane, benzene, toluene and chloro compounds, e.g., methylene chloride, chloroform and carbon tetrachloride.

The reaction requires the presence of a basic material capable of neutralizing the replaceable chlorines in the chlorine-containing esters. Suitable bases are alkali metal and alkaline earth hydroxides and carbonates and tertiary amines. An excess of diamine can be present if desired. The basic material should be present in stoichiometric amount, i.e., substantially the amount necessary to react with all of the chlorines which are capable of forming hydrogen chloride under the conditions of reaction.

The process of this invention provides a polyamide wherein the acid portions of the amide are derived from trichloromethyl or tetrachloroethylene esters of dibasic acids. Surprisingly the trichloromethyl and tetrachloroethylene portions of the esters are found in the polyamides as urea and oxamide groupings, respectively. Furthermore, the dibasic acid portion is also found in the polymer. Thus, one molecule of the chlorine-containing ester as heretofore defined provides at least two different dibasic acid moieties in the resultant polyamide. When the number of carbons in each of the acid and alcohol portions of the chlorinated esters is different, copolyamides result as shown by yield, chemical and infrared analysis. Thus, when the alcohol portion contains two carbons and the acid one as in tetrachloroethylene carbonate, a polyoxamideurea is obtained which has in regular sequence in the polyamide chain, oxamide and urea units. The properties of such a copolymer are different from those heretofore available wherein the dibasic acid residues occur at random throughout the polyamide chain. For example, the copolyamide having the acid portion in regular sequence is more soluble in polyamide solvents. This is important when spinning of fibers from solution is desired.

The time required for the reaction is generally quite short and the temperature is generally relatively low. This is advantageous since the usual polyamide-forming reactions require considerable time and high temperatures to produce high molecular weight polyamides.

The ratio of reactants is preferably that desired in the final products. The hydrogen-bearing amine may be present in excess if the amount of alkali is insufficient to neutralize the hydrogen halide. If the chlorinated ester is present in excess, it will not all be used to form the polyamide. The equivalent molar ratio of hydrogen-bearing amine group to reactive chlorine should be substantially 1 to 1; however, this can be varied to from 1 to 2 to 2 to 1.

The polyamides of this invention are useful in the preparation of fibers in applications wherein polyamides of the nylon type are finding utility, e.g., in fabrics, and particularly in uses where relatively high softening points are desired. The polyamides which contain chlorine, e.g., those from bis-trichloromethyl dichloromalonate, have increased resistance to burning.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of a polyamide which comprises contacting, in admixture in an inert diluent, (1) a monomeric organic compound having two hydrogen-bearing amino groups separated by at least two carbon atoms, said organic compound being hydrocarbon except for the amino groups, (2) an ester, containing only carbon, oxygen, and chlorine, of a member of the group consisting of dibasic carboxylic acids of 1–3 carbons and the half acid chlorides of such dibasic acids, and an alcohol of the group consisting of trichloromethanol and tetrachloroethylene glycol, and (3) a basic material comprising a member of the group consisting of alkali and alkaline earth metal hydroxides and tertiary amines.

2. The process for the preparation of a polyamide which comprises contacting, in admixture in an inert diluent, (1) a monomeric organic compound having two hydrogen-bearing amino groups separated by at least two carbon atoms, said organic compound being hydrocarbon except for the amino groups, (2) tetrachloroethylene carbonate, and (3) a basic material comprising a member of the group consisting of alkali and alkaline earth metal hydroxides and tertiary amines.

3. The process of claim 2 wherein said organic compound is a diprimary amine.

4. The process of claim 2 wherein the diprimary amine is hexamethylenediamine.

5. The process for the preparation of a polyamide which comprises contacting, in admixture in an inert diluent, (1) a monomeric organic compound having two hydrogen-bearing amino groups separated by at least two carbon atoms, said organic compound being hydrocarbon except for the amino groups, (2) bis(trichloromethyl)oxalate, and (3) a basic material comprising a member of the group consisting of alkali and alkaline earth metal hydroxides and tertiary amines.

6. The process of claim 4 wherein said organic compound is a diprimary amine.

7. The process of claim 5 wherein the diprimary amine is hexamethylenediamine.

8. The process for the preparation of a polyamide which comprises contacting, in admixture in an inert diluent, (1) a monomeric organic compound having two hydrogen-bearing amino groups separated by at least two carbon atoms, said organic compound being hydrocarbon except for the amino groups, (2) tetrachloroethylene bis(chlorocarbonate), and (3) a basic material comprising a member of the group consisting of alkali and alkaline earth metal hydroxides and tertiary amines.

9. The process of claim 7 wherein said organic compound is a diprimary amine.

10. The process of claim 8 wherein the diprimary amine is hexamethylenediamine.

References Cited in the file of this patent

UNITED STATES PATENTS

| | | |
|---|---|---|
| 2,130,948 | Carothers | Sept. 20, 1938 |
| 2,252,554 | Carothers | Apr. 20, 1943 |

OTHER REFERENCES

Ser. No. 348,683, Schlack (A.P.C.), published Apr. 20, 1943.